L. K. WILLIAMS.
Steam Cooking Apparatus.
No. 125,155. Patented April 2, 1872.
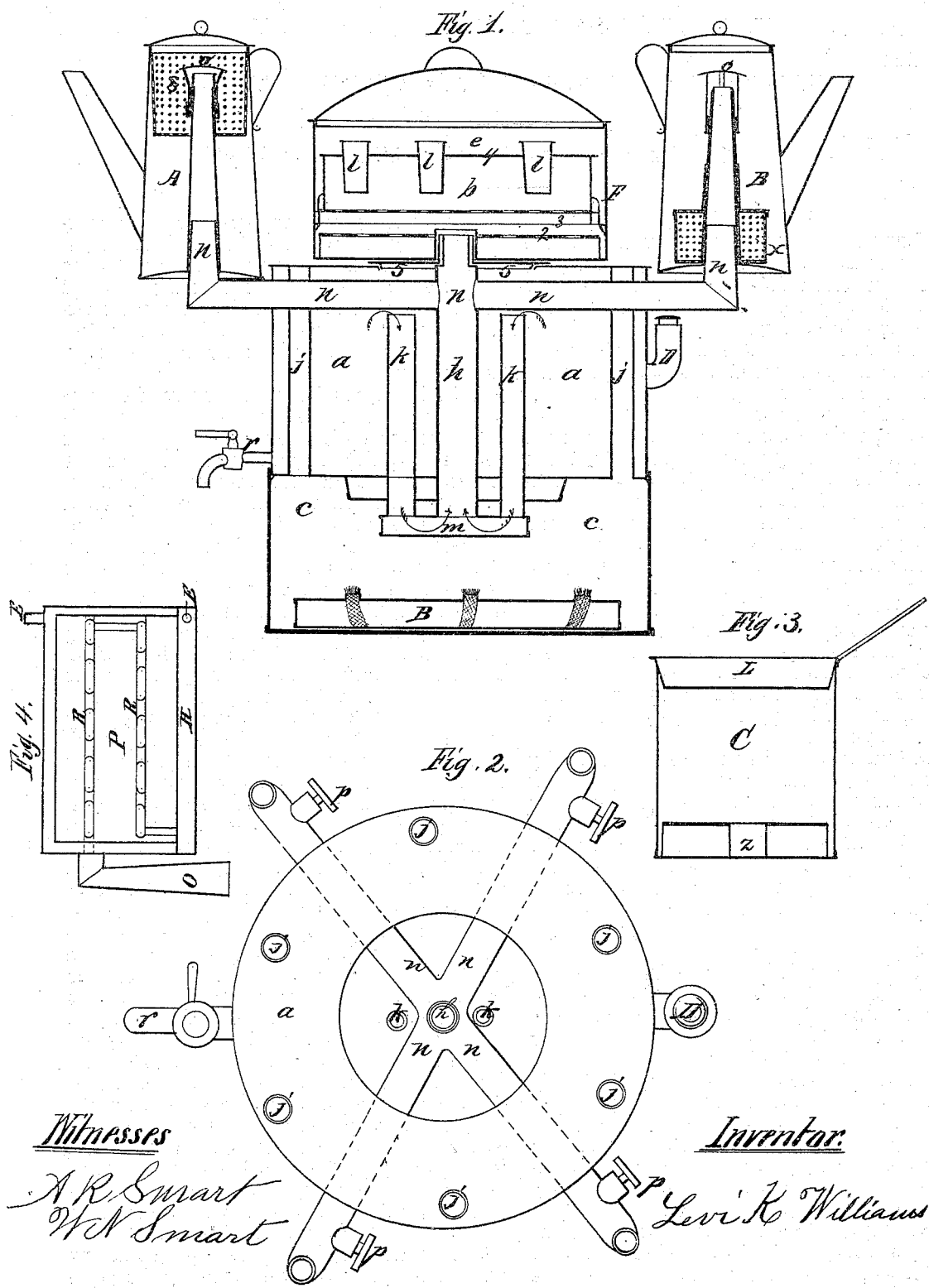

നo. 125,155

UNITED STATES PATENT OFFICE.

LEVI K. WILLIAMS, OF HUDSON, MICHIGAN.

IMPROVEMENT IN STEAM COOKING APPARATUS.

Specification forming part of Letters Patent No. 125,155, dated April 2, 1872.

SPECIFICATION.

I, LEVI K. WILLIAMS, of Hudson, in the county of Lenawee and State of Michigan, have invented certain Improvements in a Steam Cooking Apparatus, of which the following is a specification:

The nature of my invention relates to the arrangement of a vessel or boiler to be used on a stove or over a spirit-lamp, so that, by means of steam-pipes used in connection with the same, any number of dishes may be cooked at the same time by means of steam, without interference with each other, and so that the effluvia from one vessel may not enter into any other or return to the boiler from whence the steam proceeds or is generated.

Reference is made to the accompanying drawing, in which Figure 1 is a sectional view of the device through its center; Fig. 2, a plan view on the top; Fig. 3, a sectional view of one of the cooking-vessels; and Fig. 4, a sectional view of an oven connected therewith.

Fig. 1 shows the boiler $a$, as it appears when setting over a lamp, B being the lamp, and C the lamp-furnace.

The operation of the device is substantially as follows: Water is put into the boiler $a$, at the aperture D, until a sufficient quantity is in the boiler. Fire under the boiler produces steam therein, which passes down through the pipes $k$ into the superheater $m$, where the steam is superheated, and then passes up through the pipe $h$ into the radial pipes $n$, from whence it discharges into the different cooking-dishes, as shown in Fig. 1. It will be seen that the condensed steam cannot return to the boiler $a$, and that the water therein remains pure and may be used for other purposes, and can be drawn at the cock $r$. Any number of radial pipes $n$ may be used to accommodate any number of cooking-vessels. $p$ $p$ are stop-cocks to shut off the steam from any vessel it may be desired, and regulate the quantity of steam in the vessel. The boiler $a$ is also furnished with a series of perpendicular pipes, $j$, passing entirely through from top to bottom, which, when the apparatus is used over a lamp, furnish an escape for the smoke and gas from the flame, and also to give a greater heating surface, on the principle of a tubular boiler; but, when used over a common cook-stove, play no part, particularly, in heating, as they come outside the hole in the stove. The superheater $m$ is very useful, as it heats the steam hot enough, so that any kind of cooking may be done with it in the most satisfactory manner, even baking bread or frying a steak, which is more particularly described hereinafter.

5, in Fig. 1, is a lid which covers the aperture in the top of the boiler $a$, and is intended to fit steam-tight over the upper end of the pipe $h$, Fig. 1, and on the top of the boiler. $e$ is a large cooking-vessel, setting on the top of the boiler $a$, and receives the steam at the center of the bottom, as shown in said figure, and has perforated partitions in it, shown at 2, 3, and 4, on which vegetables or other things may be cooked. The partition 4 has a series of quite large perforations, in which sit cups $l\ l$, for the purpose of cooking custards, &c. A, Fig. 1, is a coffee-pot of peculiar construction. The steam-pipe $n$ passes up through its center nearly to the top, and furnished near the top with a perforated cup or compartment, in which the coffee is placed. The steam passes up through the pipe $n$, strikes the concave cup $o$ at its top, and passes down through the coffee to the water below, thus preventing the coffee from getting into the drink, and making, by the action of the steam, a much better drink than the old way of boiling the coffee in the water. B is a tea-pot, operating on about the same principle of the aforesaid coffee-pot, except that the perforated receptacle $x$ for the tea is at the bottom of the pot, so it may boil in the water, but at the same time prevents the tea-leaves from getting out into the drink. The oven P, Fig. 4, consists of a box rectangular in shape, as shown. The steam enters the side through the pipe O, which attaches to the end of one of the pipes $n$, Fig. 2. The steam passes through the coil-pipe partitions R across and back, and thence into the bottom H, and from thence discharges through the exhaust-pipe E. Bread may be baked in this oven, or meat may be fried on the coil-partitions R, with a dish placed under to catch the juices, without any danger of burning.

The superheater $m$ may be replaced at any time, if burned out, by unscrewing the pipes $h$ and $k$ therefrom and putting a new one in place. The pipes may be attached, however, in any other manner desired.

The whole device, combined, constitutes almost an entire set of stove-furniture, requiring but little more than simply a fire to cook a whole meal at once, economizing thereby in fuel, time, and quantity of separate articles of stove-furniture.

Having thus described my invention, what I claim as new, and desire to secure by Letters Patent, is as follows:

1. I claim the boiler $a$, constructed as shown, with the perpendicular steam-pipes $h$, $j$, and $k$, radial steam-pipes $n$, superheater $m$, lid 5, cocks $r$ and $p$, and receiving-spout D, arranged and operating substantially as set forth.

2. I claim the oven P, constructed, as shown, with coil-pipe partitions R, pipe $o$, condensing-chamber H, and exhaust-pipe E, arranged and operating substantially as set forth.

3. I claim the general combination and arrangement of the boiler $a$, vessels A, B, C, P, and $e$, lamp B, and furnace $c$, severally constructed, operating, and arranged substantially as and for the purposes set forth.

4. I claim the cooking apparatus described as a new article of manufacture.

LEVI K. WILLIAMS.

Witnesses:
A. R. SMART,
W. N. SMART.